April 25, 1967 E. A. VITALIS ET AL 3,316,120
PROCESS FOR PREPARING TOPCOATED PLASTICIZED NON-FIBROUS
REGENERATED CELLULOSE FILM AND THE RESULTANT PRODUCT
Filed June 3, 1966
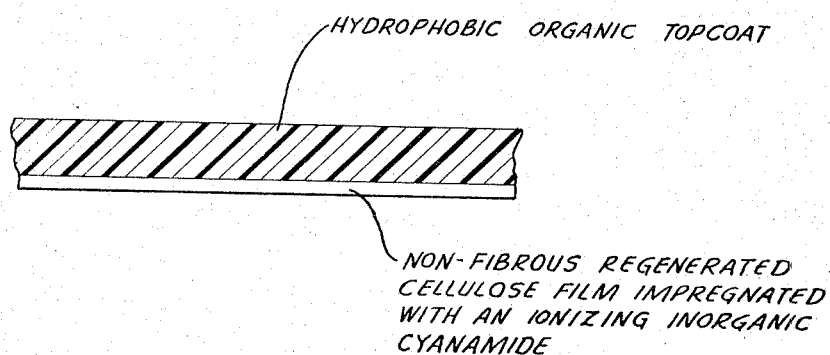
HYDROPHOBIC ORGANIC TOPCOAT
NON-FIBROUS REGENERATED CELLULOSE FILM IMPREGNATED WITH AN IONIZING INORGANIC CYANAMIDE
INVENTORS
EMIL A. VITALIS
CLEMMON PORTER
BY
ATTORNEY

United States Patent Office 3,316,120
Patented Apr. 25, 1967

3,316,120
PROCESS FOR PREPARING TOPCOATED PLASTICIZED NON-FIBROUS REGENERATED CELLULOSE FILM AND THE RESULTANT PRODUCT
Emil A. Vitalis and Clemmon Porter, both of Stamford, Conn., assignors to American Cyanamid Company, Stamford, Conn., a corporation of Maine
Filed June 3, 1966, Ser. No. 562,039
4 Claims. (Cl. 117—76)

This is a continuation-in-part of copending application Serial Nos. 19,494 and 220,941 filed on Apr. 4, 1960, and Aug. 28, 1962 both now abandoned.

The present invention relates to non-fibrous regenerated cellulose film. More particularly, the invention relates to the preparation of plasticized cellulose film having anchoring properties by use of a solution of an inorganic cyanamide, with topcoat material thereon, and includes the topcoated film itself.

Non-fibrous regenerated cellulose film is manufactured commercially by extruding viscose solution into dilute sulfuric acid as coagulating bath, followed by washing and neutralization of residual acid. When dried directly (i.e., without a plasticizer), the film is brittle and weak, and valueless for most commercial purposes. It is accordingly customary to provide the film with a content of plasticizer such as glycerol, and film which contains 10%–20% by weight thereof is generally considered satisfactorily flexible.

Non-fibrous cellulose film is water-permeable, but can be used for the wrapping of moist and wet materials when provided with a hydrophobic organic topcoat. The natural adhesion between the hydrophilic cellulose film and the hydrophobic organic matter is poor, so that the topcoat tends to slough off after short exposure to moisture, but it is known that adhesion between the two is greatly increased when the film contains a small amount of certain nitrogenous resins. Resins which promote this adhesion are termed "anchoring agents," and at the present time all cellulose film intended to be topcoated is provided with a content of anchoring agent, generally 0.1%–3% of the weight thereof.

It is customary and as a practical matter necessary to apply the plasticizer and anchoring agent together as one bath. However, the two materials are generally exhausted from the bath at different rates, so that the bath must be analyzed at regular intervals and the ratio between the two components maintained uniform.

The discovery has now been made that non-fibrous regenerated film impregnated with a solution of an ionizing normally water-soluble inorganic cyanamide and dried at elevated temperature possesses both good flexibility and good anchoring properties for subsequently applied hydrophobic organic topcoat material. In the process, the treating bath need contain no more than one component, as a result of which maintenance of the bath at proper operating composition is simplified.

Ionizing inorganic cyanamides suitable for use in the present invention are the water-soluble salts of free cyanamide, and include cyanamide itself ($H_2NCN$), sodium hydrogen cyanamide ($NaHNCN$), disodium cyanamide ($Na_2NCN$), calcium hydrogen cyanamide $$[Ca(HNCN)_2]$$

and triethanolamine hydrogen cyanamide. The invention thus does not depend upon the particular cation or mixture of cations which is present, so long as the cyanamide as a whole is water-soluble.

Aqueous solutions of cyanamide are prepared by slurrying calcium cyanamide in water, precipitating the calcium by addition of carbon dioxide, and filtering. Inorganic cyanamide salts are prepared by adding appropriate alkalis to aqueous solutions of cyanamide, or by slurrying calcium cyanamide in water and adding an appropriate water-soluble sulfate for example sodium sulfate, which yields sodium hydrogen cyanamide.

Film is treated according to the present invention by impregnation with an aqueous solution containing an effective amount of one or more ionizing inorganic cyanamides to impart the desired plasticization and anchoring properties, followed by heating the film to dry it. It is unnecessary to heat the film to insolubilize the cyanamide or to cause it to react with the cellulose.

The content of ionizing inorganic cyanamide in the treating bath depends on the amount of plasticization and anchorage which is desired to impart to the film. In general, the solution should contain at least about 5% by weight of the cyanamide (calculated as $H_2NCN$), as this is about the least amount which provides good plasticity and strength. Better results are obtained as the cyanamide content of the solution increases, but improvements per increment of added cyanamide are minor above a content of 33% by weight, which is therefore regarded as the practical maximum. In practice we have found that solutions containing 5% to 15% by weight of the cyanamide, calculated as described, give very satisfactory results while minimizing consumption of the agent and this range is accordingly preferred. The cyanamide itself acts as plasticizer, and heating is not necessary to develop this property.

The drying step is performed at a temperature of at least about 150° F. This is about the minimum temperature for development of good anchoring properties. Better results are obtained at higher temperatures, up to about 250° F. This temperature should not be materially exceeded as deterioration of the cellulose begins. This film is heated only until it is dry, and it is unnecessary to continue the heating until the cyanamide is insolubilized.

Film treated as described above may be topcoated in any convenient manner as known in the art employing hot melt resins, lacquers, emulsions, etc.

Amongst those water-repellent topcoats which may be used in the final treatment of the cellulosic films, after they have been subjected to treatment in the resin bonding bath, are those coating compositions containing as film-forming constituent compounds such as nitrocellulose, cellulose acetate, methyl cellulose, polyethylene, vinyl chloride-vinylidene chloride copolymer, and other vinylidene chloride copolymers now denominated "Saran," deacetylated chitin, rubber, chlorinated rubber, rubber hydrochloride, ethyl cellulose, butyl methacrylate, moisture-resistant lacquers, waxes such as montan wax, beeswax, carnauba wax and other conventional film-forming waterproofing materials. The topcoat is not necessarily a continuous film, and may and often does consist of printed legends, revenue stamps or decorative matter.

The invention does not depend upon the particular topcoat which is applied.

The film of the present invention may contain supplementary plasticizers (for example glycol, glycerol, and pentaerythritol), supplementary anchor agents (for example polyethylenimine, polyvinylamine, and tetraethylenepentamine-epichlorohydrin resin), dyes, and fire retarding agents. These supplementary materials may be present in the treating bath, so that they are picked up by the film along with the cyanamide.

The invention is illustrated by the drawing, which represents schematically a vertical section of nonfibrous regenerated cellulose film impregnated with an ionizing cyanamide and carrying a hydrophobic organic topcoat.

The invention will be further illustrated by the examples which follow. These examples are specific embodiments of the invention and are not to be construed as limitations thereon.

Example 1

Non-fibrous regenerated cellulose film is immersed for two minutes in an aqueous solution containing 7.5% of cyanamide ($H_2NCN$) by weight, having a pH of 4.5, wiped dry to remove excess solution, clamped on frames to prevent shrinkage, and heated for 30 seconds at 200° F., until just dry. The resulting film contains 15% by weight of cyanamide and has about the same flexibility as cellulose film containing 22% glycerol by weight. The cyanamide in the film is in water-soluble state.

Example 2

The process of Example 1 is repeated using a neutral aqueous solution containing 20% by weight of sodium hydrogen cyanamide. The resulting film contains about 33% of cyanamide or water-soluble reaction product thereof.

The anchoring properties of the dried film are determined by the procedure described in Jen et al. U.S. Patent No. 2,764,507 (1956), whereby the film is coated with nitrocellulose lacquer, dried, immersed in hot water at 190° F. and rubbed periodically between the fingers to determine the time at which the topcoat commences to slough from the film. The topcoat remains adherent for 60 minutes.

Example 3

The procedure of Example 1 is repeated except that the pH is adjusted to 10 by addition of triethanolamine. The bath thus contains the equivalent of triethanolamine hydrogen cyanamide as treating agent. The film is topcoated by the method of Example 2. The topcoat remains adherent for 105 minutes.

Example 4

The procedure of Example 2 is repeated except that the nitrocellulose lacquer is replaced by a vinylidene chloride-acrylonitrile copolymer lacquer. The topcoat remains adherent for 20 hours.

Example 5

The procedure of Example 3 is repeated except that the nitrocellulose lacquer is replaced by a Saran (90%:10% vinylidene chloride-acrylonitrile copolymer) lacquer. The topcoat remains adherent for 72 hours.

Example 6

Non-fibrous regenerated cellulose film treated with cyanamide according to Example 1 is lacquered with a solution of polymethylmethacrylate in methyl ethyl ketone and dried. The topcoat remains adherent for 48 hours.

Example 7

A sheet of well-worked regenerated cellulose film is impregnated by immersion in 20% aqueous cyanamide solution for two minutes. The sheet is removed, wiped dry of unabsorbed solution, mounted on a frame and placed in a laboratory drying oven for 30 seconds. The film is dry, glassily clear, and about as well plasticized as regenerated cellulose film having a content of 25% glycerol by weight. Of the nitrogen introduced by the impregnation step, approximately 98.8% is in water-soluble state in the film after drying.

The film is rated as having "very good" anchoring properties when topcoated with Saran lacquer (a solution of polyvinylidene chloride copolymer in tetrahydrofurane).

We claim:
1. A process for the manufacture of topcoated non-fibrous regenerated cellulose film, which consists essentially in impregnating said film with an aqueous solution containing between 5% and 33% by weight of an ionizing inorganic cyanamide, heating said film at a temperature between about 150° F. and 250° F. for a time sufficient to dry said film and insufficient to convert said cyanamide to water-insoluble state, and topcoating said film with hydrophobic organic topcoat material.
2. A process according to claim 1, wherein the topcoat is nitrocellulose lacquer.
3. A process according to claim 1, wherein the topcoat is a Saran lacquer.
4. Non-fibrous regenerated cellulose film prepared by the process of claim 1.

References Cited by the Examiner

UNITED STATES PATENTS

| | | | |
|---|---|---|---|
| Re. 20,845 | 9/1938 | Charch et al. | 117—144 |
| 2,440,330 | 4/1948 | Dreyfus | 8—61 |
| 2,961,323 | 11/1960 | Underwood et al. | 117—145 X |
| 2,980,554 | 4/1961 | Gentile et al. | 117—76 |

WILLIAM D. MARTIN, *Primary Examiner.*

R. HUSACK, *Assistant Examiner.*